United States Patent [19]

La Heij et al.

[11] 3,864,278

[45] Feb. 4, 1975

[54] POLYMERIZATION CATALYST

[75] Inventors: Gerardus E. La Heij; Gerrit J. van Amerongen, both of Amsterdam, Netherlands

[73] Assignee: Shell Oil Company, Houston, Tex.

[22] Filed: Oct. 24, 1973

[21] Appl. No.: 409,111

[30] Foreign Application Priority Data

Dec. 4, 1972 Great Britain .................... 55860/72

[52] U.S. Cl. ............................ 252/429 B, 260/94.3

[51] Int. Cl. ............................................ C08d 1/14

[58] Field of Search ................................ 252/429 B

[56] References Cited

UNITED STATES PATENTS

| | | | |
|---|---|---|---|
| 2,956,992 | 10/1960 | Geisler et al. | 252/429 B X |
| 3,058,970 | 10/1962 | Rust et al. | 252/429 B X |
| 3,442,878 | 5/1969 | Gippin | 252/429 B X |
| 3,530,107 | 9/1970 | Yoshioka et al. | 252/429 B X |
| 3,580,899 | 5/1971 | Massoubre | 252/429 B X |
| 3,676,416 | 7/1972 | Makimoto | 252/429 B X |
| 3,709,851 | 1/1973 | Mori et al. | 252/429 B X |

*Primary Examiner*—Patrick P. Garvin
*Attorney, Agent, or Firm*—H. W. Haworth

[57] ABSTRACT

A process for preparation of a Ziegler-type catalyst having increased activity comprises admixing titanium tetrachloride, trihydrocarbyl aluminum and an ether, aging the mixture followed by addition of a dihydrocarbyl aluminum chloride prior to contact with the ethylenically unsaturated monomer to be polymerized.

11 Claims, No Drawings

POLYMERIZATION CATALYST

BACKGROUND OF THE INVENTION

It is known that ethylenically unsaturated monomers such as isoprene can be polymerized by means of an ether-modified Ziegler-type catalyst, e.g., a $TiCl_4$/trialkyl aluminum-based catalyst. The principal effects of the ether modifier are a reduction in gel content, and increase in molecular weight, an increase in swelling index and sometimes a slightly lower reaction rate. It has now been found that addition of a dihydrocarbyl aluminum chloride ($R_2AlCl$) to such ether-modified $TiCl_2$ catalysts enhances the activity thereof.

It is known that $R_2AlCl$ is unsatisfactory in the preparation of $TiCl_3$ catalysts — by reduction of $TiCl_4$ — for the polymerization of isoprene. At best isoprene will polymerize at a low reaction rate and with poor yields, and the product will have a poor microstructure. It has been suggested in U.S. Pat. No. 3,442,878 that $R_2AlCl$, used to destroy impurities in the isoprene or the polymerization solvent, may improve the yield in the polymerization operation. It has now been found that $R_2AlCl$ added to the aged catalyst results in an important gain in catalyst activity.

SUMMARY OF THE INVENTION

The invention provides a process for the preparation of a $TiCl_3$ catalyst having increased activity in the polymerization of isoprene, which comprises admixing $TiCl_4$, trihydrocarbyl aluminum and an ether, thereafter aging the catalyst mixture thus obtained, and adding a dihydrocarbyl aluminum chloride to the aged catalyst mixture, prior to being brought into contact with isoprene. The invention also relates to a process for the polymerization of isoprene employing said catalyst.

DESCRIPTION OF PREFERRED EMBODIMENTS

Examples of trihydrocarbyl aluminum ($ALR_3$) compounds which may be used in the process according to the invention are trimethylaluminum, triisobutyl aluminum, trioctyl aluminum, tricyclohexyl aluminum, and mixtures thereof. Suitable trialkyl aluminum compounds in which the alkyl groups have 2–4 carbon atoms each, may be employed such as triethyl or triisobutyl aluminum, the latter compound being preferred.

Any organic ether may be used in the process according to the invention. Preferred ethers are those represented by the formula R''—O—R', wherein R' and R'' can be the same or different alkyl, cycloalkyl, aryl or alkenyl groups. Thus diethyl ether, di-n-propylether, di-n-butyl ether, di-isoamyl ether, anisole, di-n-hexylether, n-propyl phenyl ether, diphenyl ether and the like can be utilized. Di-n-butyl ether and diphenyl ether have been found to provide very good results.

The molar ratio of $AlR_3$ to $TiCl_4$ to be used in the preparation of the catalyst mixture can vary within the range of 0.8 to 1.2, preferably of 0.9 to 1.0. The molar ratio of the ether to $TiCl_4$ can vary from about 0.01 to 10, preferably from about 0.1 to 1.

The reaction between $AlR_3$, $TiCl_4$ and ether is suitably carried out in the presence of a diluent. Suitable diluents are aliphatic or cycloaliphatic hydrocarbons such as cyclohexane or isooctane and suitable concentrations of $TiCl_4$ and $AlR_3$ are in the range of 50 to 1,000 mmol/l. Titanium concentrations below 50 mmol/l may result in reduced activity due to insufficient reduction of $TiCl_3$.

The temperature at which the catalyst components (i.e., $TiCl_4$, aluminum trihydrocarbyl and the ether) are admixed is preferably below 270°K, and particularly in the range from about 200° to about 260°K. Higher and lower temperatures may be used, if desired, though temperatures above 300°K are less desirable.

The order of addition of the unaged catalyst components is essentially immaterial provided that $TiCl_4$ and the ether should not be initially admixed in the absence of $AlR_3$. The $AlR_3$ and $TiCl_4$ may be admixed whereupon the ether is added. Preferably, the ether is mixed with $AlR_3$ and the mixture added to the $TiCl_4$. Some agitation is beneficial to development of high catalyst activity.

After admixing the catalyst components the catalyst mixture is aged. Although aging temperatures up to 370°K may be employed, preferred temperatures are below 300°K, and especially in the range from about 240° to about 260°K. During aging a highly active catalyst composition is formed containing $TiCl_3$ in the beta-modification. The time required for this transformation is usually at least 10 minutes; aging periods from about 30 minutes to about 10 hours are preferred. Aging times of more than 10 hours are usually not beneficial to a further increase in catalytic activity. After aging at the preferred temperatures between 240° and 260°K the temperature of the catalyst mixture may be raised up to 300°K or higher which usually increases the catalytic activity still further. It should be remembered, however, that at temperatures above 270°K the catalyst slowly deteriorates. Prolonged storage at temperatures above 270°K is, therefore, to be avoided. Safe storage temperatures of aged catalyst mixtures are preferably below 250°K.

After aging of the catalyst mixture but prior to contact with isoprene, a dihydrocarbyl aluminum chloride ($AlR_2Cl$) is added thereto. The hydrocarbyl groups in $AlR_2Cl$ are preferably alkyl groups having 1 to 12 carbon atoms such as methyl, ethyl, n-propyl, isobutyl, n-hexyl, 2-ethylhexyl and dodecyl. It will be understood that the two hydrocarbyl groups in $AlR_2Cl$ need not be the same. A preferred representative of $AlR_2Cl$ is diethyl aluminum chloride.

The amount of $AlR_2Cl$ to be added to the aged catalyst mixture is generally such as to provide 0.05–2, preferably 0.1–0.5 mol of $AlR_2Cl$ per atom of titanium.

The $AlR_2Cl$ is added to the catalyst mixture prior to the introduction of the monomer. In certain cases some interval of time, e.g., 5–60 minutes, may be useful before the catalyst is contacted with e.g., isoprene, especially when the concentrations of the catalyst mixture and $AlR_2Cl$ are relatively low. The temperature at which $AlR_2Cl$ and the catalyst mixture are admixed may be the same as the polymerization temperature. Generally speaking, suitable polymerization temperatures are between 250° and 390°K and particularly between 270° and 320°K.

Suitable catalyst concentrations in the reaction mixture during polymerization are usually below 20 milliatoms, preferably between 0.05 and 5 milliatoms of titanium per liter. It may be advantageous to add the catalyst incrementally on a continuous basis during the polymerization until near the point where the desired degree of conversion has been reached.

The polymerization is suitably carried out in a liquid diluent for which purpose the same diluents may be employed as used in the preparation of the catalyst mixture. Preferred diluents are isopentane, cyclohexane, toluene, and tertiary amylenes. The term tertiary amylenes describes a hydrocarbon mixture containing 2-methyl-1-butene, 2-methyl-2-butene and 3-methyl-1-butene. The polymerization may be continued until polyisoprene concentrations of e.g., 5–50%w, preferably of 15–25%w in the diluent have been obtained.

Preferably isoprene is homopolymerized. Other dienes such as piperylene may be present in small amounts, e.g., less than 0.5%w based on total dienes. Higher amounts tend to decrease the polymerization rate and the cis-1,4 content as well as the molecular weight of the polyisoprene. Butadiene may be present in large amounts, e.g., 2%. The isoprene feed as well as the diluent, may be purified by methods known in the art, e.g., by distillation, treatment with a sodium dispersion, percolation over a molecular sieve, and the like.

The following examples further illustrate the invention but are not intended to limit the scope thereof. Catalyst activity has usually been indicated by percent conversion in a given time, also by the polymerization rate constant $k$. This constant was calculated from the conversion data according to the equation:

In $(C_o/C_1) = K (t_1 - t_o)$, in which $C_o$ is the initial isoprene concentration at timt $t_o$, $C_1$ the isoprene concentration after a polymerization time $t_1$ minutes and $k$ is the first-order polymerization rate constant in $min^{-1}$. The limiting viscosity number (LVN) was measured in toluene at 303°K. The Hoekstra viscosity was measured at 373°K after loading the specimen for 30 seconds with 0.98 $MN/m^2$, as described in Proceedings Rubber Technology Conference, London 1938, page 362 and in Rubber Plastics Age 42 (1971) 1079. The cis-1,4 content was measured by Nuclear Magnetic Resonance (NMR).

EXAMPLE I a. The catalyst was prepared from (1) a solution of $TiCl_4$ in isooctane and (2) a mixture of di-n-butyl ether and aluminum triisobutyl ($AlBu_3$) in isooctane. The $AlBu_3$ ether solution was added to the $TiCl_4$ solution at 253°K. A titanium concentration of 50 mmol/l was employed. All operations were carried out under nitrogen with the exclusion of oxygen and moisture. After the catalyst mixture was aged for 1 hour at 253°K and for 1 hour at 293°K, aluminum dialkychloride ($AlR_2Cl$) was added immediately prior to polymerization. Comparative examples without $AlR_2Cl$ added to the catalyst were also performed.

b. The polymerizations were performed in pressure-tight 500 ml bottles, half-filled with liquid, out of contact with oxygen and moisture. The polymerization solvent was isopentane, the isoprene concentration 20%w, and the titanium concentration 2 mmol/l. Polymerization was effected at 293°K for 30 minutes. The polymerization was stopped by addition of 0.1%w of methanol, based on the mixture. After addition of 0.2%w of a phenolic stabilizer (available under the trademark "IONOX" 330) based on polymer, the polymer was recovered by steam stripping and drying under vacuum at 325°K. Results are shown in the following table.

| Experiment | a | b | c | d | e | f | g | h | 1 | 2 |
|---|---|---|---|---|---|---|---|---|---|---|
| Ether/$AlBu_3$ molar ratio | 0 | 0 | 0 | 0 | 0.25 | 0.25 | 0.25 | 0.25 | 0.25 | 0.25 |
| $AlBu_3/TiCl_4$, molar ratio | 0.85 | 0.85 | 0.85 | 0.85 | 0.85 | 0.85 | 0.85 | 0.85 | 0.85 | 0.85 |
| Al-diethyl-chloride, mmol/l * | — | 0.5 | — | (d) | — | 0.5 | (g) | (d) | 0.5 | — |
| Al-di-iso-butyl chloride, mmol/l * | — | — | 0.5 | — | — | — | — | — | — | 0.5 |
| Polymerization: | | | | | | | | | | |
| % conversion of isoprene | 45 | 65 | 10 | 15 | 67 | 78 | 72 | 12 | 83 | 82 |
| k, $min^{-1}.10^{-3}$ | 10 | 17 | 2 | 3 | 18 | 25 | 21 | 2 | 30 | 29 |
| Hoekstra viscosity | 42 | 34 | nd | nd | 46 | 42 | 37 | nd | 36 | 32 |
| LVN, dl/g | 4.4 | 3.4 | nd | nd | 4.0 | 4.2 | 3.4 | nd | 4.1 | 3.5 |
| % cis-1,4 | nd | nd | nd | nd | 99 | 99 | nd | nd | 99 | nd |

*) based on liters polymerization mixture.

Experiments *a–h* for comparison. In experiment *f* the Al-diethyl-chloride was added to the isoprene/isopentane mixture.

nd – not determined d. — 0.1 mmol Al-tri-isobutyl/l added to catalyst mixture.

g. — 0.5 mmol Al-ethyl-ethoxy-chloride/l added to the catalyst mixture.

A further comparative experiment was performed, substantially under the conditions of experiment *e*, in which in addition to the aluminum triisobutyl, 0.05 moles of aluminum diethyl chloride per mole of $TiCl_4$ was added in the preparation of the catalyst mixture. Isoprene conversion was 5%, the rate constant $k$ 0.001 $min^{-1}$.

EXAMPLE II

Substantially as described in respect of the above experiments 1 and 2, further experiments 3 and 4 were made in which diphenyl ether was employed instead of di-n-butylether. After the catalyst mixture was aged aluminum diethyl chloride was added thereto in an amount equivalent to 0.5 mmol/l of polymerization mixture. Results are shown in the following table.

| Experiment | 3 | 4 |
|---|---|---|
| Diphenylether/$AlBu_3$, molar ratio | 0.5 | 1.0 |
| Isoprene conversion, % | 84 | 86 |
| k, $min^{-1} \cdot 10^{-3}$ | 31 | 33 |
| LVN, dl/g | 2.6 | 2.5 |
| Hoekstra viscosity | 45 | 36 |

EXAMPLE III

Substantially as described hereinbefore, experiments were performed with dodecyl-4-tolylether (DTE) and dinonylether (DNE).

| Experiment | 5 | 6 |
|---|---|---|
| DTE/$AlBu_3$, molar ratio | 0.5 | — |
| DNE/$AlBu_3$, molar ratio | — | 0.25 |
| Al-di-ethylchloride, mmol/l | 0.5 | 0.5 |
| Isoprene conversion, % | 84 | 86 |
| k, $min^{-1} \cdot 10^{-3}$ | 31 | 33 |

EXAMPLE IV

Substantially as described in the previous examples, a number of polymerizations was effected in various solvents. In all cases a molar ratio between $AlBu_3$ and $TiCl_4$ of 0.85 was employed. To the aged catalyst 0.5 mol/l of Al-di-ethylchloride was added. Further conditions and results are given in the following table.

| Experiment | 7 | 8 | 9 | 10 | 11 | 12 | 13 | 14 | 15 |
|---|---|---|---|---|---|---|---|---|---|
| Ether employed, molar ratio ether/$AlBu_3$ | | | | | | | | | |
| Di-n-butylether | 0.25 | 0.25 | 0.25 | 0.25 | 0.25 | — | — | — | — |
| diphenylether | — | — | — | — | — | 1.0 | — | — | — |
| dinonylether | — | — | — | — | — | — | 0.25 | 0.25 | — |
| dodecyl-4-tolylether | — | — | — | — | — | — | — | — | 0.5 |
| Polymerization: | | | | | | | | | |
| solvent used | IP | IP | CH | CH | CH | IP | IP | CH | IP |
| temperature °K | 293 | 293 | 293 | 293 | 313 | 293 | 293 | 313 | 293 |
| time, hours | 0.5 | 2 | 0.5 | 2 | 2 | 0.5 | 0.5 | 2 | 0.5 |
| Isoprene conversion, % | 83 | 91 | 87 | 95 | 83 | 86 | 85 | 85 | 84 |

IP - isopentane
CH - cyclohexane

What is claimed is:

1. A process for the preparation of a $TiCl_3$-based polymerization catalyst having increased activity which consists essentially of admixing $TiCl_4$, trihydrocarbyl aluminum and ether having the formula R''—O—R', wherein R' and R'' are the same or different alkyl, cycloalkyl, aryl or alkenyl groups, in a molar ration of ether to $TiCl_4$ of from about 0.1 to about 10.0 and in a molar ratio of trihydrocarbyl aluminum to $TiCl_4$ of from about 0.8 to about 1.2, thereafter aging the catalyst mixture thus obtained, and adding from about 0.05 to about 2 moles of a dihydrocarbyl aluminum chloride per atom of titanium to the aged catalyst mixture, prior to being brought into contact with monomer.

2. A process as in claim 1 wherein the trihydrocarbyl aluminum employed is a trialkyl aluminum having alkyl groups of 2–4 carbon atoms each.

3. A process as in claim 1 wherein the molar ratio of ether to $TiCl_4$ is from about 0.1 to about 1.0.

4. A process as in claim 3 in which the ether is selected from the group consisting of di-n-butyl ether and diphenyl ether.

5. A process as in claim 1 in which the molar ratio of trihydrocarbyl aluminum to $TiCl_4$ is between about 0.9 and about 1.0.

6. A process as in claim 1 wherein the catalyst mixture is aged at a temperature between about 240°K and about 260°K.

7. A process as in claim 1 wherein the dihydrocarbyl aluminum chloride employed is a dialkylaluminum chloride, the alkyl groups having 1–12 carbon atoms each.

8. A process as in claim 7 wherein the dialkylaluminum chloride is diethylaluminum chloride.

9. A process as in claim 1 wherein the amount of dihydrocarbyl aluminum chloride is from about 0.1 to about 0.5 moles per atom of titanium.

10. The catalyst obtained by the process of claim 1.

11. A process as in claim 1 wherein the admixing of $TiCl_4$, trihydrocarbyl aluminum and the ether is carried out in the presence of an aliphatic or cycloaliphatic hydrocarbon diluent wherein the concentration of $TiCl_4$ and trihydrocarbyl aluminum is in the range of about 50 to about 1,000 mmol/l.

* * * * *